Figure 1:
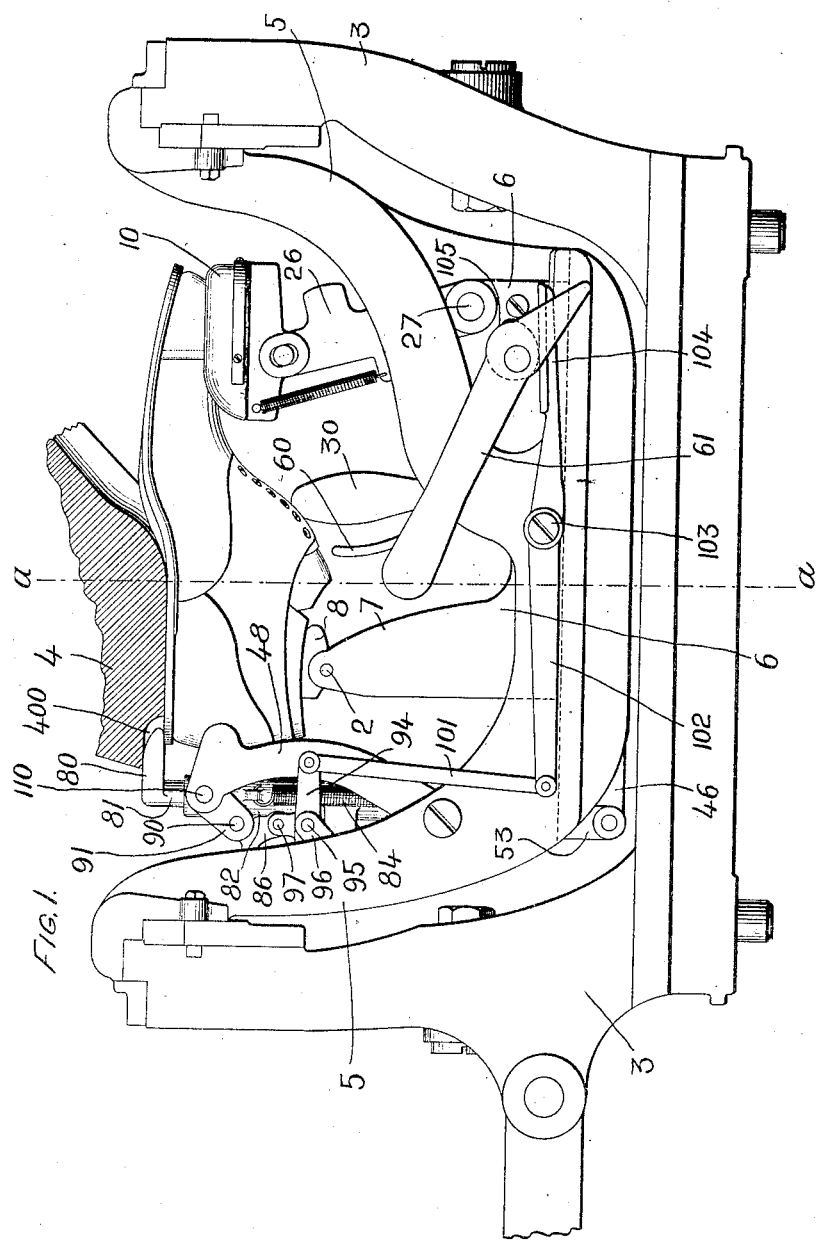

T. G. PLANT.
SHOE JACK.
APPLICATION FILED APR. 25, 1908.

958,278.

Patented May 17, 1910.
5 SHEETS—SHEET 1.

WITNESSES:
Amelia M. Ross
Marion F. Kimball

INVENTOR,
Thomas G. Plant,
BY Robt G. Harris,
ATTY.

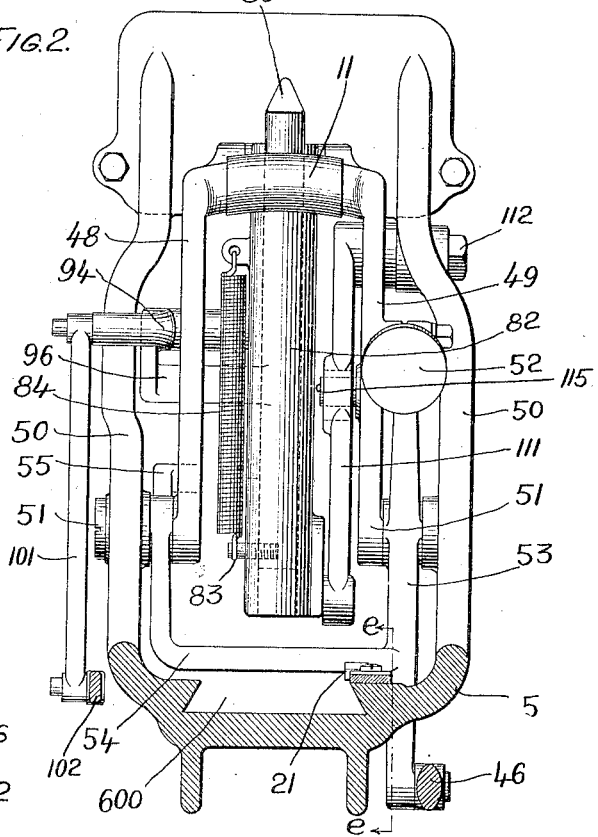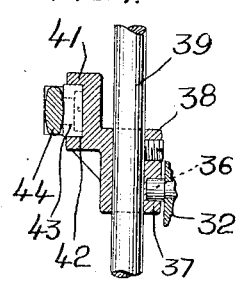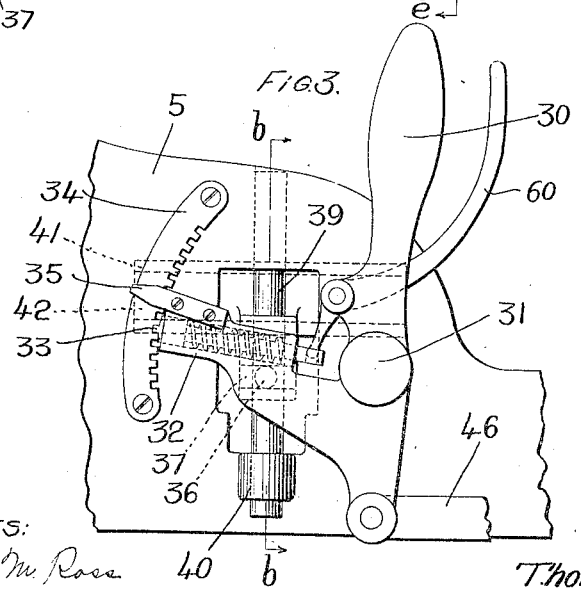

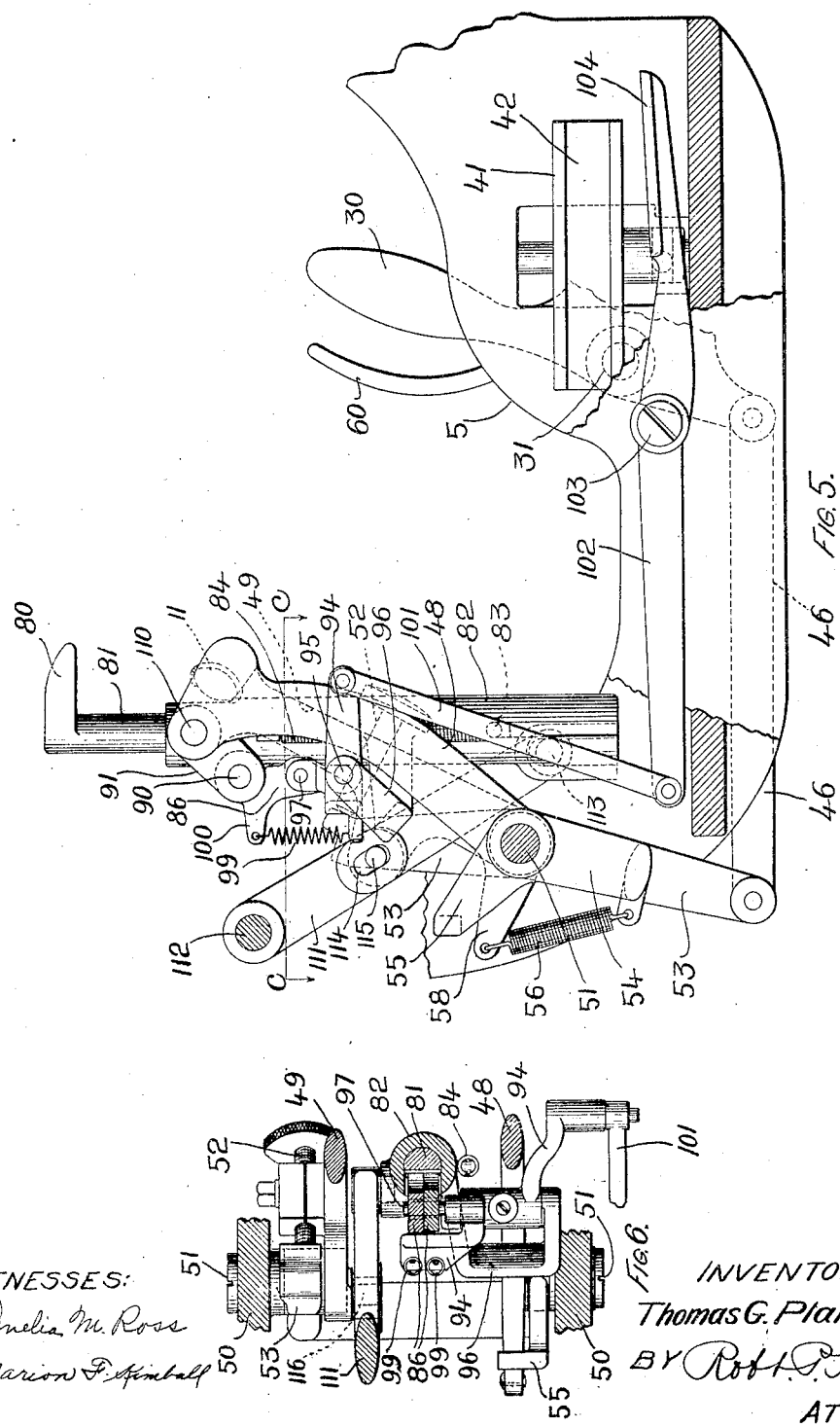

T. G. PLANT.
SHOE JACK.
APPLICATION FILED APR. 25, 1908.
958,278.
Patented May 17, 1910.
5 SHEETS—SHEET 4.
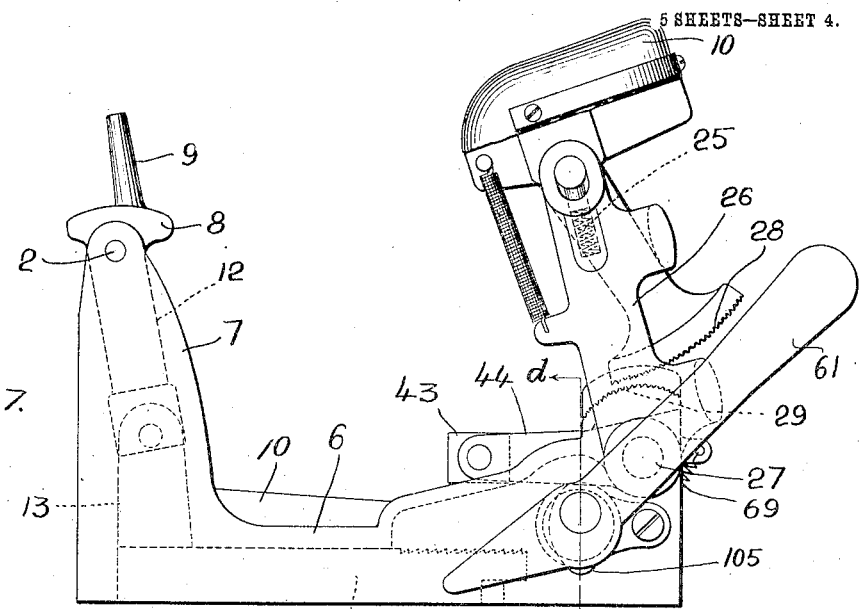
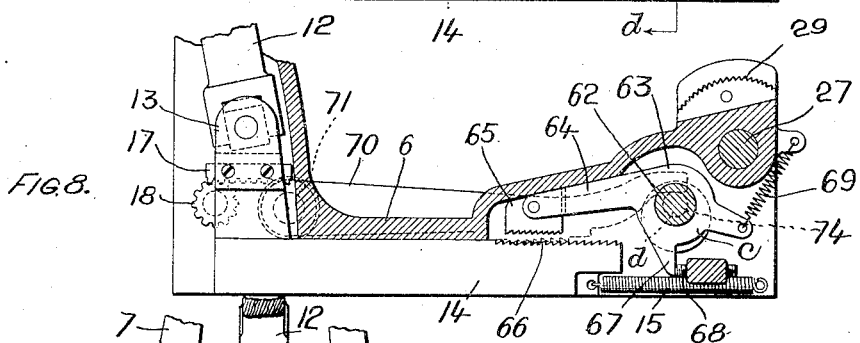
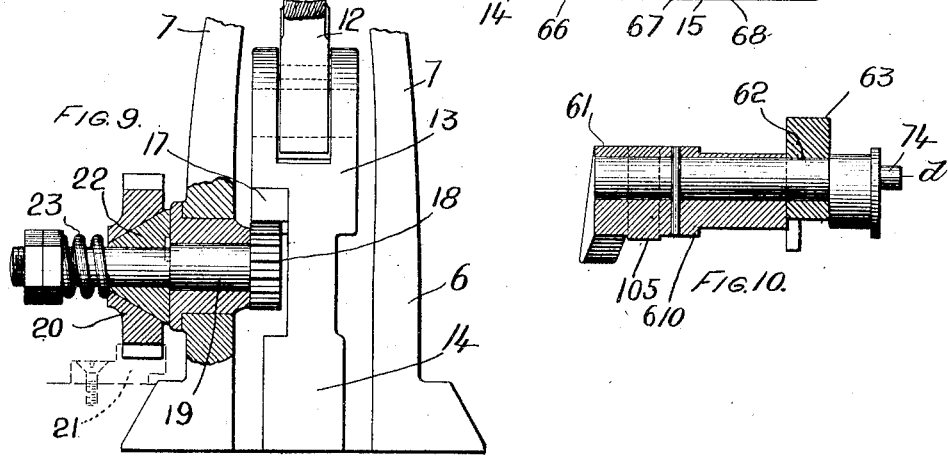
WITNESSES:
Amelia M. Ross
Marion F. Kimball
INVENTOR.
Thomas G. Plant,
BY Robt. F. Harris
ATT'Y.

T. G. PLANT.
SHOE JACK.
APPLICATION FILED APR. 25, 1908.

958,278.

Patented May 17, 1910.
5 SHEETS—SHEET 5.

WITNESSES:
Amelia M. Ross
Marion P. Kimball

INVENTOR.
Thomas G. Plant,
BY Robt. P. Harris,
ATTY.

UNITED STATES PATENT OFFICE.

THOMAS G. PLANT, OF BOSTON, MASSACHUSETTS.

SHOE-JACK.

958,278. Specification of Letters Patent. Patented May 17, 1910.

Application filed April 25, 1908. Serial No. 429,202.

*To all whom it may concern:*

Be it known that I, THOMAS G. PLANT, a citizen of the United States, residing at Boston, in the county of Suffolk and State of Massachusetts, have invented an Improvement in Shoe-Jacks, of which the following description, in connection with the accompanying drawings, is a specification, like numerals on the drawings representing like parts.

This invention relates to jacks for sustaining shoes while being acted on during the process of manufacture, and especially to jacks adapted to support shoes during the sole-leveling or laying operation.

The jack herein illustrated is of that type in which the last-supporting means comprises a last block having a projecting last pin on which the last is removably sustained and a toe rest for supporting the toe of the last, this being the type of jack that is commonly used in laying and leveling the soles of the Goodyear welt shoe. This sole-leveling operation is commonly performed by a pressing form or roll which is caused to act on the sole of the shoe progressively toward and from the toe end thereof. When the form is acting on the extreme toe end of the sole, there is a tendency for the sole or last to lift at the heel end, and one of the objects of the present invention is to provide a novel heel hold-down adapted to act on the heel end of the sole of the shoe thereby to resist any such tendency.

In the present embodiment of my invention this heel hold-down and the last-supporting means are movable relative to each other manually so that after the last has been placed on the last-supporting means the parts may be moved relative to each other manually, thereby to properly position the heel end of the sole and the heel hold-down relative to each other so that the hold-down may act on the heel end of the sole for accomplishing the desired result. The hold-down is normally situated above the level of the sole so as to permit of this relative movement, and after the lasted shoe and the hold-down have been properly positioned horizontally, the hold-down is moved vertically thereby to bring it against the sole, this movement preferably being accomplished by the movement of the sole-leveling or laying form.

Suitable devices are also provided for locking the hold-down in its operative or clamping position, and these devices are controlled as to their operative or inoperative position.

The jack herein illustrated is of that type which comprises a last-positioning device in the form of a heel gage which is adjustable to adapt it to position correctly shoes of different sizes.

One feature of my invention is so to associate the heel hold-down with such an adjustable last-positioning device that the hold-down will always be in proper position regardless of position of said device. This is herein accomplished by connecting the hold-down with the last-positioning device so that said hold-down will be adjusted with said device when the latter is adjusted for different sizes of shoes.

Other objects of my invention are to improve in various ways a jack of this type, all as will be more fully hereinafter described and then pointed out in the claims.

Figure 11:
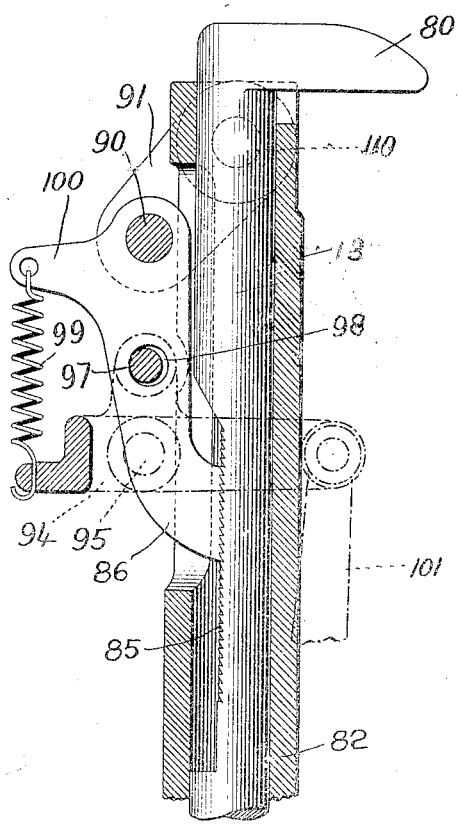
Figure 12:
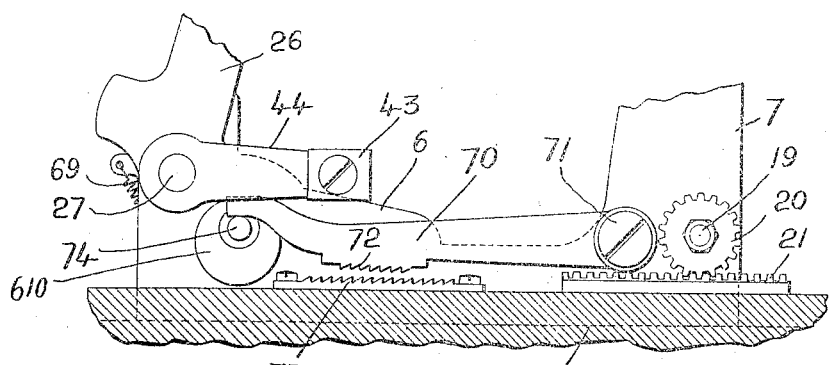

In the drawings wherein is shown one type of jack embodying my invention, Figure 1 is a side view of the jack, said figure showing part of the sole-leveling form; Fig. 2 is a section through the cradle on substantially the line $a$—$a$, Fig. 1; Fig. 3 is a detail of the mechanism for adjusting the parts for different sizes of shoes; Fig. 4 is a section on the line $b$—$b$, Fig. 3; Fig. 5 is a fragmentary side view of the heel hold-down, the heel gage and the parts for adjusting the latter; Fig. 6 is a section on the line $c$—$c$, Fig. 5; Fig. 7 is a side view of the saddle supporting the last pin and toe rest; Fig. 8 is a vertical sectional view through the lower portion of said saddle; Fig. 9 is an end view of the lower portion of the saddle with a part broken out; Fig. 10 is a section through the shaft on the line $d$—$d$, Fig. 7; Fig. 11 is an enlarged sectional view of the hold-down; Fig. 12 is a detail of the locking device for locking the saddle from backward movement, said figure being taken on substantially the line $e$—$e$, Fig. 2.

The jack herein illustrated and in which I have chosen to embody my invention for illustrative purposes comprises a reciprocating frame 3 which reciprocates in proper timed relation with the rolling or oscillating movement of the sole-leveling or laying form 4 (part of which only is shown in Fig. 1), the cradle 5 which is supported by the frame 3 in any usual or suitable way, as, for instance, as shown in my co-pending application Serial No. 415,835, the saddle 6 which is movably mounted in ways 600 formed on the cradle and which supports the usual last pin 9 and toe rest 10, and the last-positioning device in the form of a heel gage 11 which has for its purpose to position the shoe properly and preferably the ball line thereof with relation to the form 4 and which is shown as being carried by the cradle 5. This positioning of the shoe is accomplished by moving the saddle 6 with its last pin and toe rest relative to the heel gage to bring the counter portion of the shoe against the heel gage.

The last pin 9 is extended from a last block 8 which is pivotally mounted at 2 on a standard 7 extending from the saddle 6 and some suitable means are provided such, for instance, as means similar to that illustrated in a co-pending application filed July 13, 1906, by Erastus Woodward, Se. No. 326,008, for swinging the last pin forward thereby to cause it first to come to a bearing in or measure the pin socket in the last, and then by a further movement to jack the last when the saddle 6 is moved toward the heel gage to bring the counter of the shoe against the latter for the purpose of positioning the shoe properly relative to the sole-pressing form 4. The mechanism for accomplishing this comprises an arm 12 rigid with the last block 8 and pivotally connected to the upright portion 13 of a slide bar 14 that is received within the saddle 6 and is capable of movement relative thereto, said slide bar having connected thereto a spring 15 which normally keeps it in the position shown in Fig. 8. The slide bar has rigid therewith a rack 17 adapted to engage a pinion 18 fast on a shaft 19 journaled in bearings formed in the side of the saddle 6, and said shaft has frictionally held thereon another pinion 20 which meshes with a stationary rack bar 21 secured to the cradle 5. The frictional engagement between the pinion 20 and the shaft 19 is secured by providing said shaft with a friction block 22 (see Fig. 9) which is rigid therewith and which has frictional engagement with the pinion 20, such frictional engagement being maintained by the spring 23. Since the stationary rack 21 is situated beneath the pinion 20 while the rack 17 is above the pinion 18, the rearward movement of the saddle will cause the slide bar 14 to move ahead of the saddle thereby swinging the last pin 9 forwardly, as will be obvious.

The toe rest 10 may be of any suitable or usual construction and it is shown as being yieldingly sustained by springs 25 which in turn are carried by a stand 26 pivoted to the saddle at 27 so that by swinging the stand 26, the toe rest may be moved toward and from the last pin to accommodate different sizes of lasts. The toe rest is pivotally sustained by the stand 26 so that it will automatically find its proper position when the toe of the last is brought thereagainst, and it has depending therefrom a locking foot 28 which is adapted to be brought into locking engagement with a serrated rest 29 when pressure is applied to the toe rest during the final jacking operation, whereby the latter becomes locked in the position it has assumed. This construction of toe rest forms no part of my present invention.

The heel gage 11 is also capable of adjustment for different sizes of shoes, and said heel gage and toe rest are preferably, although not necessarily connected together so that both are adjusted simultaneously by a single lever, the purpose of this construction being to provide a jack adapted to accommodate different sizes of shoes which when adjusted for any size of shoe will properly position said shoe so that one invariable point, such, for instance, as the ball line of the sole, will be brought to one invariable position on the jack and relative to the leveling form, all as more fully described in the said application to Woodward above referred to. In the device shown in said Woodward application, the adjusting lever for adjusting the positions of the heel gage and toe rest for different sizes of shoes is situated beneath the last-supporting means and works about a vertical axis. In the present invention this construction is altered so as to make the adjusting lever more convenient for the operator to handle. This lever is shown at 30 and it is pivoted at 31 to the side of the cradle to turn about a horizontal axis. It is formed with an arm 32 carrying a latch pin 33 which is adapted to engage in any one of a plurality of notches formed in a locking quadrant 34 carried by the cradle 5, as clearly seen in Fig. 3, and which latch pin is operated by a latch lever 60 pivoted to the lever 30. The arm 33 may also carry a pointer or index member 35 which coöperates with a suitable notation placed either on the quadrant 34 or on the cradle 5 to indicate the proper position of the handle for different sizes of shoes. The arm 32 has extending therefrom a pin or projection 36 (see Figs. 3 and 4) that engages in a groove 37 formed in a block 38 rigidly carried by a rod 39 mounted to slide vertically in bearings 40 carried by the cradle 5. This block 38 has formed thereon a head 41 provided with a horizontal groove 42 in which is received a projection 43 extending from an arm 44 rigid with the pivoted stand 26. The shifting movement of the lever 30 about its pivot 31 will obviously raise or lower the head 41 and thus swing the stand 26 about its pivot 27 thereby to carry the toe rest 10 toward or from the last pin.

For simultaneously adjusting the heel gage, the lever 30 has connected thereto a link 46 which is operatively connected to the heel gage and by which the latter is adjusted. This heel gage is in the form of a cross bar 11 adapted to engage the counter or exterior heel portion of the shoe and carried by two arms 48, 49 that are pivoted to the sides 50 of the cradle at the two alined points 51, see Fig. 2. The arm 49 carries an adjusting screw 52 which bears against the upper end of a lever 53 also pivoted at the point 51, said lever being pivotally connected to the end of the link 46. The adjusting screw 52 is maintained in contact with the lever 53 by means of a spring 56, one end of which is attached to an L-shaped arm 54 which extends from the lever 53 and the other end of which is attached to an arm 58 rigid with the arm 48 of the heel gage. With this construction the movement of the lever 30 in a direction to lower the head 41 and thereby adjust the toe rest toward the last pin for the smaller sizes of shoes will act through the link 46, lever 53 and adjusting screw 52 to swing the heel gage forwardly about its pivotal points 51.

The above-described parts are so constructed that when the jack is adjusted for any size of shoe and a lasted shoe is jacked thereon, the heel gage is properly located to bring the one invariable point of the sole of the shoe, such, for instance, as the ball line of the sole, always in one invariable position with relation to the jack and the form, all as more fully described in said Woodward application.

The purpose of the adjusting screw 52 is to provide means for adjusting the heel gage relative to the lever 53 so that the proper relative position between the heel gage and the toe rest may be secured. When this proper relative position has been once secured, it will not be necessary to further manipulate the adjusting screw 52. Since the groove 42 is a horizontal one, it will be observed that the saddle may be moved toward and from the heel gage without disturbing the proper relative position between the toe rest and heel gage, and in all positions of the saddle an operative connection between the stand 26 and the heel gage is maintained so that the toe rest and heel gage may be adjusted simultaneously.

The placing of the lever 30 at the side of the cradle puts it in a much more convenient position to be operated. The heel gage herein shown is supported from two pivotal points 51 in alinement with each other and thus said heel gage is more securely held in its adjusted position than where it is supported from one point only as in the device shown in said Woodward application.

When the jack is in position to receive a lasted shoe, the last pin is tilted backwardly, as shown in Fig. 7, and after the last has been placed on the last pin, the saddle is moved rearwardly to bring the counter of the shoe against the heel gage, as shown in Fig. 1, and during such movement the last pin is swung forwardly thereby bringing the toe of the lasted shoe against the toe rest which automatically finds its correct position and becomes locked in such position as above described. The locking of the jack in its jacking position is accomplished by a jacking lever 61, the operation of which is somewhat similar to that of the jacking lever illustrated in said Woodward application. The lever as herein shown is fixed to a shaft 610 journaled in the cradle and is provided with the eccentric portion 62 on which is loosely mounted a hub 63 having an arm 64 extending therefrom which carries a toothed block 65, the teeth of which are adapted to engage the toothed portion 66 of the slide bar 14. The hub 63 also has extending therefrom a lug 67 that is adapted to engage a stop pin 68 sustained by the saddle, said lug being held against the stop pin by a spring 69. When the jacking lever 61 is in inoperative position, as shown in Fig. 7, the eccentric portion 62 of the shaft 610 raises the hub 63 into the position shown in Fig. 8 thereby lifting the toothed block 65 from the slide bar 14, the hub being held in this position by the stop screw 68. When the jacking lever is thrown into its operative position, as shown in Fig. 1, the eccentric portion 62 of the shaft moves the hub 63 forward thereby bringing the toothed block 65 into engagement with the teeth on the slide bar 14 and the further movement of the jacking lever operates to put a thrust on the arm 64 in the direction of the last pin thereby forcing the slide bar 14 slightly farther to the rear and not only locking it in such position, but taking up any slack or lost motion in the parts and setting the last firmly on the toe rest.

The saddle 6 is locked in its retracted position when the shoe is jacked by means of a locking lever 70 (see Fig. 12) which is shown as pivoted to the saddle at 71 and as provided with locking teeth 72 adapted to engage coöperating locking teeth 73 formed in or secured to the cradle 5. The locking lever 70 is normally held out of operative position by an eccentric projection 74 carried by the shaft of the jacking lever, said projection being so situated that when the jacking lever is in inoperative position, as shown in Fig. 7, the pin 74 is in its elevated position under the end of the locking lever 70 thereby maintaining said lever elevated. When the jacking lever is thrown into its operative position the eccentric pin 74 is turned to permit the locking lever 70 to drop into engagement with the locking teeth 73 whereby the saddle is locked against movement to the right Fig. 1. When it is desired to unjack the lasted shoe, the jacking lever 61 is turned into its inoperative position as shown in Fig. 7 thereby disengaging the lock 70 from the teeth 73, and also disengaging the block 65 from the slide bar so that the saddle can be moved away from the heel gage and the last pin may be swung into the position shown in Fig. 7.

While the form 4 is operating on the toe end of the sole of the shoe, the pressure of the form against the toe end tends to lift the heel of the sole from the last, and in some cases the heel of the last from the last support, and to prevent this I have devised a novel form of heel hold-down which is adapted to engage the heel end of the sole and prevent the latter from rising when the toe end of the sole is being subjected to the leveling pressure.

My improved heel hold-down is normally situated above the plane of the sole and is so arranged that the manual rearward movement of the saddle to bring the counter of the shoe against the heel gage carries the heel of the shoe under the hold-down. The hold-down is adapted for downward movement to permit it to be brought firmly against the heel end of the shoe sole after the last has been properly positioned relative to the hold-down, and in the preferred embodiment of my invention, said hold-down is arranged so that the downward vertical movement thereof to bring it against the heel of the shoe is effected by the form 4 during the relative movement between said form and the last to bring the former against the sole of the shoe. Suitable means are also provided for locking the hold-down in its clamping position and for subsequently unlocking it after the leveling operation is completed.

The hold-down herein illustrated is designated by 80 and it is shown as sustained by a stem 81 which is slidably mounted in a tubular support 82. The stem 81 has projecting therefrom a pin or projection 83 which plays in a slot in said support and to which is attached one end of a spring 84, the other end of said spring being secured to said tubular support whereby the spring tends to maintain the hold-down in elevated position. The stem of the hold-down is provided with ratchet teeth 85 which are adapted to be engaged by corresponding teeth on one or more locking pawls 86, said pawls operating by their engagement with the teeth 85 to hold the hold-down in its lowered position. The pawls are preferably under manual control in such a way that when the shoe is jacked they will be held in locking engagement with the stem 81, while when it is desired to unjack the shoe, said pawls may be manually disengaged from the stem of the hold-down, thus releasing the latter. I find it convenient to control these pawls manually by or through the jacking lever 61, by a mechanism which is constructed so that when the jacking lever is in its operative position, as shown in Fig. 1, which is the position it occupies when the shoe is jacked, the locking pawls will be in locking engagement with the stem of the hold-down, thus holding it in clamping position against the heel part of the sole of the shoe, while when the jacking lever is thrown into its inoperative position, as shown in Fig. 7, which is the position occupied by the jacking lever when the shoe is unjacked, said pawls are disengaged from the hold-down, thus releasing the latter from its clamping position. While this result may be accomplished in various ways, I have in the present embodiment illustrated the following construction for this purpose: The pawls 86 are pivotally sustained at 90 from the two arms or links 91 pivoted to the upper end of the tubular support 82. The pawls are controlled as to their position by means of a rocking controller member 94 which is pivoted at 95 to a yoke-shaped arm 96 rigid with the support 82, said rocking controller 94 having a pin 97 projecting therefrom which enters apertures 98 in the pawls 86. A spring 99 connects the tail 100 of each pawl with the controller 94, as plainly seen in Fig. 11, said springs tending normally to throw the pawls into locking engagement with the stem 81. The aperture 98 in each pawl is preferably larger than the pin 97, as shown in Fig. 11, thereby allowing the pawls to have sufficient movement to click over the teeth 85 while the hold-down is being depressed into engagement with the shoe. The rocking controller 94 is connected by a link 101 with a lever 102 which is pivoted to the cradle at 103, see Fig. 5. The end 104 of said lever is situated to be acted upon by a cam or eccentric surface 105 (see Figs. 1 and 10) formed on the shaft of the jacking lever 61. Said eccentric cam is so positioned that when the jacking lever is in operative position, as shown in Fig. 1, the low portion of the cam is against the end 104 of the lever thereby permitting said end to be elevated slightly and the other end correspondingly lowered. The lowering of the left hand end of said lever, Figs. 1 and 5, rocks the controller 94 about its pivot 95 thereby carrying the pin 97 toward the stem 81 and permitting the springs 99 to throw the pawls into locking engagement with said stem. When the jacking lever 61 is in its inoperative position, as shown in Fig. 7, the high portion of the cam 105 acts against the lever 103 thereby elevating the left-hand end thereof Figs. 1 and 5 and rocking the controller 94 in the opposite direction thereby to carry the pin 97 away from the stem 81 and positively disengage the pawls from said stem. As soon as the pawls are thus disengaged the hold-down is free to rise under the influence of the spring 84. The position of the pawls, therefore, is controlled manually and in the present embodiment of my invention this is done in connection with the jacking lever 61.

In the present invention the heel hold-down is associated with the heel gage in such a way that the two move together so that the hold-down is adjusted simultaneously with the heel gage and is always in proper position to be brought into clamping engagement with the heel of the shoe. To accomplish this, the support 82 has at its upper end at 110 a pivotal connection with each of the arms 48, 49 of the heel gage so that when the heel gage is moved forwardly or backwardly the upper end of the support 82 is carried forwardly or backwardly. Means are also provided for always maintaining the support in vertical position regardless of its adjusted position. For accomplishing this I have in the present embodiment provided the following construction: An arm 111 is pivoted at its upper end to the cradle or other fixed support, as at 112, and the lower end of the arm has a sliding pivotal connection with the lower end of the support 82, this being conveniently accomplished by providing said support with a slot in which operates a projection 113 extending from the lower end of said lever. Said lever has formed therein a slot 114 into which extends a projection 115 carried by the arm 49 of the heel gage. When the arms 48, 49 of the heel gage are swung about their pivotal points 51, the pin 115 acting in the slot 114 will swing the arm 111 forwardly or backwardly according to the direction in which the heel gage is moving and the arm 111 acting on the lower end of the holder 82 serves to maintain it always in vertical position.

The complete operation of jacking a shoe on my improved last will be clear from the above description, but may be briefly referred to as follows: The saddle is normally in its retracted position with the last pin 9 tilted backwardly in its position of presentation, as shown in Fig. 7. The lasted shoe is then placed in the jack with the last pin 9 occupying the socket of the last, and the saddle is then moved rearwardly in the ways 600 of the cradle to bring the heel of the lasted shoe against the heel gage. During this movement the last pin 9 is swung forwardly as above described thereby to cause it to measure or find a bearing in the last pin socket and during further continued movement of the saddle, the toe of the lasted shoe is brought against the toe rest which automatically finds its proper position against the shoe and which is then depressed into locking engagement with the serrated rest 29. When the saddle has been moved thus to carry the shoe against the heel rest and properly position the shoe, the jacking lever is turned into its operative position, as shown in Fig. 1, and the movement thereof into this position brings the toothed block 65 into engagement with the slide bar 14, and the result is that any lost motion is taken up and the shoe is firmly set against the toe rest. This operation of the jacking lever also throws the locking pawls 86 into operative engagement with the stem 81. The movement of the saddle to bring the shoe against the heel gage carries the heel portion of the sole under the hold-down 80, the latter being in its elevated position. When the jack and the form move relative to each other to bring said form against the sole of the shoe, the form engages the heel hold-down and forces the latter downwardly into clamping engagement with the heel of the shoe, as shown in Fig. 1, and during this movement the locking pawls 86 click over the teeth 85 and serve to lock positively the hold-down in its clamping position.

The form 4 may conveniently be provided with a recess 400 of a size to receive the heel hold-down so that when the form moves toward the sole the hold-down will enter said recess. Since the heel hold-down is positively locked against vertical movement, it acts to hold positively the heel portion of the shoe in proper position while the toe end of the sole is being subjected to the leveling pressure. After the sole has been pressed or leveled, the operator swings the jacking lever into the inoperative position shown in Fig. 7, thereby positively disengaging the pawls from the stem of the hold-down and permitting the latter to rise under the influence of the spring 84. This same movement of the jacking lever releases the block 65 from the slide bar 14 and also releases the lock 70 from the rack bar 73 so that the saddle may be moved away from the heel gage and during such movement of the saddle, the last pin is swung into its backward position, as shown in Fig. 7.

The feature of the hold-down may be used in connection with jacks of other types than that herein illustrated, and I do not intend the following claims for the heel hold-down to be limited to any particular type of jack unless such limitation is specifically made.

Having fully described my invention, what I claim as new and desire to secure by Letters Patent is:—

1. In a jack, the combination with last-supporting means including a toe-rest, of a normally elevated heel hold-down mounted on and movable with said jack, said parts being manually movable relatively to each other to bring the heel end of the shoe into position under the heel hold-down.

2. In a jack, the combination with last-supporting means, of a normally elevated heel hold-down mounted on said jack, said last-supporting means being movable manually toward the heel hold-down to bring the heel end of the shoe beneath said heel hold-down, means for jacking the last, and means operated by the jacking means for locking the hold-down.

3. In a jack, the combination with last-supporting means, of a vertically movable heel hold-down mounted on and movable with said jack and normally sustained in position above the level of the sole of the lasted shoe sustained by said means, said parts being movable manually relative to each other to bring the heel portion of the shoe into position beneath the heel hold-down, and locking means for said hold-down when in lowered position.

4. In a jack, the combination with a heel gage, of last-supporting means including a toe-rest movable toward and from the heel gage thereby to position the last, and a heel hold-down to engage the heel end of the last and locking means to hold the latter to the last-supporting means.

5. In a jack, the combination with a heel gage, of last-supporting means including a last pin and toe-rest movable toward and from the heel gage thereby to position the last, a heel hold-down associated with the heel gage, and means for tilting the last pin to jack the last.

6. In a jack, the combination with a heel gage and means to adjust said gage for different sizes of shoes, of last-supporting means movable toward and from the heel gage thereby to position the last, a heel hold-down normally in position to be presented over the heel end of the last by such movement of the last-supporting means, and locking means for the hold-down.

7. In a jack, the combination with a heel gage, of last-supporting means including a last pin and toe-rest movable toward and from the heel gage thereby to position the last, a heel hold-down normally in position to be presented over the heel end of the last by such movement of the last-supporting means, said hold-down being freely depressible into clamping engagement with the heel portion of the sole of the lasted shoe, and locking means for the hold-down.

8. In a jack, the combination with a last-pin and toe-rest, of an adjustable heel gage constructed and arranged to engage the exterior heel portion of a shoe, a heel hold-down adjustable with the heel gage, and means to tilt the last-pin and jack the shoe.

9. In a jack, the combination with a heel gage constructed and arranged to contact with the exterior heel portion of a shoe for positioning a shoe on the jack, means to adjust said gage for different sizes of shoes, and a heel hold-down adjustable into different positions to correspond to the different positions of the heel gage.

10. In a jack, the combination with a heel gage constructed and arranged to contact with the exterior heel portion of a shoe for positioning a shoe on the jack, means to adjust said gage for different sizes of shoes, a heel hold-down adjustable with the heel gage, and means to lock the hold-down in lowered position.

11. In a jack, the combination with last-supporting means including a last-pin and toe-rest, of a heel gage constructed and arranged to contact with the exterior heel portion of a shoe adjustable for different sizes of shoes, said last-supporting means being movable toward the heel gage whereby the latter positions the lasted shoe, a heel hold-down adjustable with the heel gage, and jacking means for tilting the last pin.

12. In a jack, the combination with last-supporting means, of a heel gage adjustable for different sizes of shoes, said last-supporting means being movable toward the heel gage whereby the latter positions the lasted shoe, a heel hold-down normally situated above the sole of the lasted shoe in such position that the heel end of said lasted shoe is brought under the hold-down by such movement of the last-supporting means, said hold-down being freely depressible into clamping engagement with the sole of said shoe, and a lock for the hold-down.

13. In a jack, the combination with last-supporting means including a last-pin and toe-rest, of a heel hold-down movable into clamping engagement with the heel of the lasted shoe supported on said means, means to lock positively the heel hold-down in clamping position, and means for tilting the last-pin to jack the shoe.

14. In a jack, the combination with last-supporting means including a last-pin and toe-rest, of a heel hold-down movable into clamping engagement with the heel end of the sole of the lasted shoe supported by said means, and a manually-controlled lock to maintain the hold-down in clamping position as the toe portion of the shoe is being treated.

15. In a jack, the combination with last-supporting means including a last-pin and toe-rest, of a heel hold-down movable vertically to bring it against the heel portion of the sole of a lasted shoe, a manually-controlled lock to maintain said hold-down in such position, and jacking means for tilting the last-pin and operating the lock.

16. In a jack, the combination with last-supporting means including a last-pin and toe-rest, of a heel hold-down normally held above the level of the sole of the lasted shoe but adapted to be freely moved into operative position against said shoe sole, means to lock positively said hold-down in its operative position, and jacking means controlling said lock.

17. In a jack, the combination with last-supporting means including a last block and toe rest, of a jacking lever for jacking the last thereon, a heel hold-down movable into position against the heel end of the sole of the jacked shoe, and a lock for the heel hold-down controlled by the jacking lever.

18. In a jack, the combination with last-supporting means including a last block and toe rest, of a jacking lever for jacking the last thereon, a heel hold-down movable into position against the heel end of the sole of the jacked shoe, a lock to maintain the hold-down in its operative position, and means operated by the jacking lever to release said lock when the jacking lever is thrown into its inoperative position.

19. In a jack, the combination with last-supporting means including a last block and toe rest, of a jacking lever for jacking the last thereon, a heel hold-down movable into position against the heel end of the sole of the jacked shoe, a lock to maintain the hold-down in its operative position, and means operated by the jacking lever to throw said lock into operative position when the jacking lever is in its operative position.

20. In a jack, the combination with last-supporting means, of a heel hold-down, a spring to maintain said hold-down normally above the level of the jacked shoe, a lock to maintain said hold-down in operative position against the heel end of the sole of the lasted shoe, and jacking means controlling said lock.

21. In a jack, the combination with last-supporting means, of a vertically-movable heel hold-down adapted to be moved into clamping position against the heel end of the sole of the jacked shoe by end pressure applied to the upper end of the said hold-down, jacking means, and a lock for the hold-down controlled by the jacking means.

22. In a jack, the combination with last-supporting means, of a vertically-movable heel hold-down adapted to be moved into clamping position against the heel end of the sole of the jacked shoe by end pressure applied to the upper end of the said hold-down, means to lock the hold-down in its operative position, and a jacking lever for controlling said lock.

23. In a jack, the combination with last-supporting means including a last-pin and toe-rest, of a vertically-movable heel hold-down adapted to be moved into clamping position against the heel end of the sole of the jacked shoe by end pressure applied to the upper end of the said hold-down, and automatically-operative manually-controlled means to lock the heel hold-down in its operative position, to prevent the heel end of the shoe rising during treatment of the toe portion.

24. In a jack, the combination with last-supporting means, of a vertically-arranged support, a heel hold-down having a stem telescoping into said support, and locking pawls on said support to maintain the hold-down in operative position.

25. In a jack, the combination with an adjustable heel gage to position a jacked shoe, of a vertically-arranged support adjustable horizontally with said heel gage, a heel hold-down sustained by said support, a lock on said support and means to maintain the support vertical in all adjusted positions thereof.

26. In a jack, the combination with a frame, of a cradle sustained thereby, a last-positioning device mounted on the cradle, last-sustaining means mounted on the cradle for movement toward and from the last-positioning device, and means for locking said sustaining means against movement.

27. In a jack, the combination with a frame, of a cradle sustained thereby, an adjustable heel gage mounted on the cradle, a last-sustaining saddle slidably mounted on the cradle for movement toward and from the heel gage, and locking means for said saddle.

28. In a jack, the combination with a frame, of a cradle sustained thereby, a heel gage mounted on the cradle, a last-sustaining saddle slidable on the cradle toward and from the heel gage, said saddle sustaining a toe rest, and means on the cradle to adjust the toe rest and heel gage simultaneously for different sizes of shoes.

29. In a jack, the combination with a frame, of a cradle sustained thereby, a last-positioning device on the cradle, a saddle slidably mounted on the cradle toward and from the last-positioning device, a last pin and a toe rest sustained by the saddle, and means to swing the last pin forwardly toward the toe rest by movement of the saddle toward the last-positioning device.

30. In a jack, the combination with a frame, of a cradle sustained thereby, a heel gage on the cradle, a saddle slidably mounted on the cradle for movement toward and from the heel gage to position a last, a toe rest on the saddle, and an adjusting lever pivoted to the cradle for simultaneously adjusting the heel gage and the toe rest.

31. In a jack, the combination with a frame, of a cradle sustained thereby, a heel gage on the cradle, a saddle slidably mounted on the cradle for movement toward and from the heel gage to position a last, a toe rest on the saddle, and an adjusting lever pivoted to the cradle to turn about a horizontal axis and operatively connected with both the heel gage and toe rest for simultaneously adjusting them for different sizes of shoes.

32. In a jack, the combination with a last-positioning device, of last-supporting means movable toward and from said device, a jacking lever on said last-supporting means for effecting final jacking of the last, and means to lock said last-supporting means from backward movement.

33. In a jack, the combination with a last-positioning device, of last-supporting means movable toward and from said device, a jacking lever on said last-supporting means for effecting final jacking of the last, and means controlled by the jacking lever to lock said last-supporting means from backward movement.

34. In a jack, the combination with last-positioning means for contacting with the exterior of and positioning a lasted shoe on a jack, means to adjust said last-positioning means for different sizes of shoes, and a heel hold-down adjustable with the last-positioning means and adapted to contact with the sole surface of a shoe on said jack to prevent the heel end thereof from rising during treatment of the sole.

In testimony whereof, I have signed my name to this specification, in the presence of two subscribing witnesses.

THOMAS G. PLANT.

Witnesses:
AMELIA M. ROSS,
MARION F. KIMBALL.